United States Patent Office 3,371,104
Patented Feb. 27, 1968

3,371,104
PROCESS OF PREPARING ACYLOXYALKYL GROUP CONTAINING POLYSILOXANES
Gerd Rossmy, Altendorf (Ruhr), and Gotz Korner, Mulheim (Ruhr), Germany, assignors to Th. Goldschmidt A.G., Essen, Germany
No Drawing. Continuation of application Ser. No. 236,119, Nov. 7, 1962. This application Feb. 3, 1967, Ser. No. 613,968
Claims priority, application Germany, Nov. 10, 1961, G 33,546; Mar. 1, 1962, G 34,375; May 9, 1962, G 34,931
20 Claims. (Cl. 260—408)

ABSTRACT OF THE DISCLOSURE

Process of preparing acyloxyalkyl group containing polysiloxanes. Compounds of the unit formula

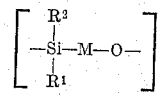

wherein $R^1$ is hydrolyzable halogen or alkoxy, $R^2$ is hydrolyzable halogen, alkoxy or monovalent hydrocarbon, and M stands for alkylene of 3–4 carbon atoms which bridges the Si in the formula with the oxygen atom through at least three carbon atoms, are reacted with
  (a) Carboxylic acids of the general formula $$X \cdot R^3 \cdot COOH$$

wherein $R^3$ is unsaturated or saturated divalent hydrocarbon, and X is hydrogen or carboxyl,
  Or (b) the anhydrides of (a),
  Or (c) mixtures of (a) and (b),
  Or (d) carboxylic acid chlorides of the general formula $Y \cdot R^3 \cdot COCl$, wherein $R^3$ has the above meaning and Y is hydrogen or carboxychloride.

When the reactant is (d), the reaction product is subjected to hydrolysis and condensation. The reaction results in a rearrangement which, when the reactant is represented by $XR^3COOH$, proceeds according to the equation

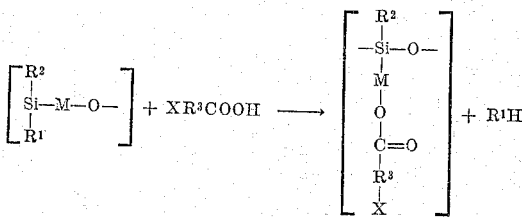

The application specifically claims the novel cyclic siloxane of the general formula

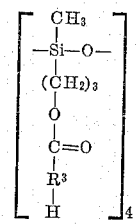

wherein $R^3$ is a divalent hydrocarbon with 5 to 21 carbon atoms.

The compounds produced by the process are suitable as impregnating agents for textiles, leather and paper. They also are excellent lubricants. Siloxanes which are modified with unsaturated acids also find use as molding resins.

---

This is a continuation of our copending application Ser. No. 236,119, now abandoned.

This invention generally relates to organosilicon compounds and is particularly concerned with acyloxyalkyl group containing siloxanes and processes for their preparation.

U.S. Patent 2,906,735 teaches a procedure pursuant to which compounds of the general formula

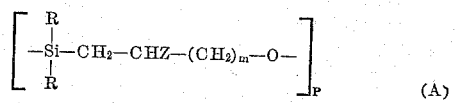

are reacted with a carboxylic acid. In the above formula (A) R represents a monovalent, saturated hydrocarbon group, Z is either hydrogen or methyl, $m$ stands for the number 1 or 2 and P is a number having a value of at least 1.

If a compound of the above-indicated formula (A) is reacted with a monocarboxylic acid, the primary reaction product is a silanol of the general formula

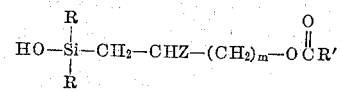

wherein the symbols have the above meaning. The silanol splits off water to condense to a disiloxane of the formula

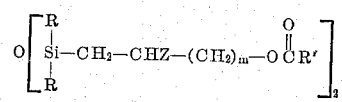

wherein the symbols have the above-indicated meaning.

As the silanol referred to always condenses to the indicated disiloxane, only disiloxanes and no polysiloxanes can be obtained. This is a serious drawback of the procedure disclosed in U.S. Patent 2,906,735 referred to.

In the event that polybasic acids, for example, a dicarboxylic acid, are used, it is feasible to obtain in accordance with the procedure of the U.S. patent referred to, products of higher molecular weights which are built up according to the following scheme:

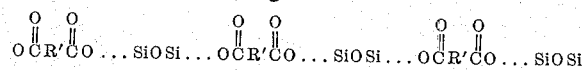

It will be realized, however, by those skilled in this particular art that such compounds have a polyester structure and cannot properly be designated as polysiloxanes. Another serious disadvantage of the prior art procedure referred to is that the required starting products of Formula A are not readily available and are expensive to manufacture.

It is a primary object of the present invention to overcome the disadvantages of the prior art procedure referred to and to provide modified polysiloxanes, that is, compounds whose monomeric moieties continuously are linked by . . . Si—O—Si . . . bridges.

Another object of the present invention is to provide a simple process for the production of such polysiloxanes from readily available starting substances.

Briefly, and in accordance with one aspect of this invention, the novel polysiloxanes are obtained by reacting compounds of the general formula

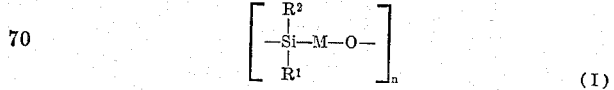

(I)

with carboxylic acids of the general formula $$X.R^3.COOH \quad (II)$$

In these formulas:

$n$ is any desired whole number,
$R^1$ stands for halogen or alkoxy,
$R^2$ is halogen, alkoxy or a monovalent hydrocarbon group,
M stands for a divalent hydrocarbon group which links the silicon and the oxygen atom through at least three carbon atoms,
$R^3$ is any desired saturated or unsaturated, unsubstituted or substituted divalent hydrocarbon group, and
X stands for hydrogen or carboxyl.

Instead of performing the reaction with carboxylic acid proper, the anhydrides may be used instead.

Compounds of the general Formula I are readily available in accordance with the disclosure of U.S. patent application Ser. No. 133,040, now Patent No. 3,193,567, filed Nov. 7, 1962.

The reaction is preferably performed with compounds of Formula I wherein $R^1$ is chlorine or alkoxy containing 1 to 4 carbon atoms, while $R^2$ is methyl, ethyl, phenyl, chlorine, or an alkoxy group containing 1 to 4 carbon atoms. The following compounds have been demonstrated to be particularly suitable for the inventive reaction: 1-methyl-1-alkoxy-1,2-siloxacyclopentane; 1,1-dialkoxy - 1,2 - siloxacyclopentane; 1-methyl-1-alkoxy-1,2-siloxacyclohexane and 1,1 dialkoxy-1,2-siloxacyclohexane. The alkoxy groups in these compounds preferably having 1 to 4 carbon atoms. The compounds may be cyclic or in chain form, monomeric or polymeric.

The reaction of these compounds with monobasic carboxylic acids or their anhydrides proceeds under splitting off of alcohol or HCl, respectively, and/or carboxylic acid ester or carboxylic acid chloride, substantially according to the following reaction course:

(a)
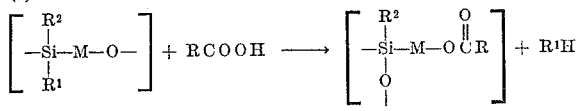

or (b)
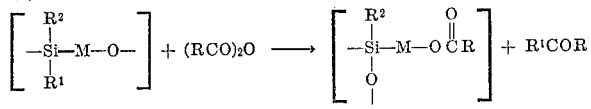

The siloxane structures thus obtained form part of a polysiloxane system which may be of cyclic or linear kind. Any desired end-blocking groups may be present. In the event that $R^2$ is of a nature capable of reaction with carboxylic acids or their anhydrides, a further cross-linking by Si—O—Si bridges may be obtained.

Additional reactions may conceivably take place, which presumably are stages within the above described overall reactions. Such additional reactions may, for example, lead to the formation of acylsilyl groups (c)
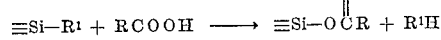

which, in their entirety or partly, may further react according to the following formula:

(d)

The formation of the ester or acid chlorides

may, of course, be accomplished directly by the action of the acid R.COOH on the $R^1$—Si≡bond.

Reactions with di- or polybasic carboxylic acids proceed in analogous manner. Two reaction possibilities should be emphasized in this connection. Thus, in addition to the branch formation through Si—O—Si linkages, further cross-linking by polyester groupings may take place as follows:

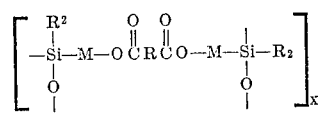

wherein $x$ is a whole number.

On the other hand, it is feasible that the second oxycarbonyl group further reacts with reactive $R_1$ or $R_2$ groups. If this happens, reactions may take place as illustrated under (c) and (d) above. Such reactions may proceed in intermolecular or intramolecular manner and, in fact, both reaction possibilities may take place side by side.

The inventive process can also be performed with substituted carboxylic acids, for example, hydroxycarboxylic acids.

From a practical point of view, the amount of carboxylic acid to be added to the reaction mixture should be chosen so that at least one oxycarbonyl group is available per —(CH$_2$)$_n$—O group. However, in many instances, it is recommended to use a larger amount of carboxylic acid, particularly since a portion of the acid may be unavailable for the described reaction proper, due to the collateral reactions (c) and (d) which may take place simultaneously.

The inventive reaction may be performed with any desired mono- or polybasic carboxylic acid. As previously mentioned, the carboxylic acid may be substituted. The acids may be saturated or unsaturated. Mixtures of carboxylic acids are also usable. The following alkylcarboxylic acids may be mentioned, by way of example, as suitable for use in the inventive reaction: capric acid, caprylic acid, caproic acid, lauric acid, stearic acid, oleic acid, linolenic acid and behenic acid. Perfluorinated carboxylic acids such as trifluoroacetic acid or perfluoroctanoic acid may be mentioned as examples for substituted carboxylic acids.

Aromatic carboxylic acids are also suitable and in this connection, benzoic acid and its derivatives are mentioned. Maleic acid or fumeric acid are suitable dibasic carboxylic acids. Further, phthalic acid and terephthalic acid or its derivatives may successfully be employed. Particularly interesting reaction possibilities result if carboxylic acids are used which contain additional functional groups as, for example, aminocarboxylic acids, ketocarboxylic acids and oxycarboxylic acids such as, for example, salicyclic acid or mercaptocarboxylic acids such as thioglycolic acid. It will thus be realized that, by correspondingly choosing a particular carboxylic acid, the inventive reaction permits the formation of a multitude of modified polysiloxanes. The use of substituted carboxylic acids renders it feasible to introduce into the siloxane system functional groups of great variety.

The reaction is advantageously carried out at elevated temperatures in the range of about 50 to 300° C. A preferred temperature range is between 110 and 250° C. The temperature may be increased slowly during the course of the reaction. If carboxylic acids or their anhydrides are used which have a relatively low boiling point, the reaction is preferably carried out in autoclaves under increased pressure. Reversely, if high boiling carboxylic acids are used, the reaction mechanism may be facilitated by reducing the pressure. In some instances, the process may be enhanced by performing the reaction in a thin layer, in a reactor suitable for thin layer reactions.

In the preparation of highly branched polysiloxanes which, in many instances, have a high viscosity value, it is recommended to employ an inert solvent as, for example, acetone, benzene, toluene, etc. Sensitive carboxylic acids are advantageously reacted in an inert gas atmosphere.

The reaction may be accelerated by the presence of esterification catalysts of known composition. Thus, for example, strong acids such as hydrochloric acid or sulphuric acid, or Friedel-Crafts catalysts such as $AlCl_3$ or $ZnCl_2$ may be employed. Tin halides including organotin halides as well as tin salts of organic acids have also proved to catalytically influence the reaction. Stannooctanoate may be mentioned as a tin salt in this connection. Also other metal salts, such as aluminum octanoate and metal alkoxides, as for example, zirconium butoxide and titanium butylate may also have catalytic use in the reaction.

If siloxalkanes are used in the reaction, wherein $R^1$ stands for alkoxy, it is feasible first to convert the alkoxy with hydrochloric acid in a preliminary step into the corresponding chlorine derivative. This may be exemplified by the following formula:

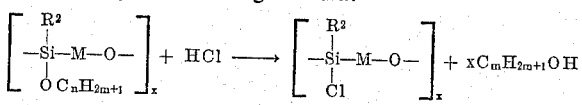

wherein $x$ is a whole number.

The reaction products are obtained in different form with respect to their siloxane structure. Thus, for example, in reacting 1-alkyl-1-alkoxy-1,2-siloxacyclopentane with long chained monobasic carboxylic acids, largely cyclic organosiloxanes are obtained which may be purified by distillation and which may be polymerized to form elastomers. The corresponding 1,1-dialkoxy compounds, by contrast, result predominantly in the formation of highly branched siloxane systems.

Excess carboxylic acid and silicon-free carboxylic acid esters can be easily removed, for example, by distillation. Generally, the reaction products can be further processed according to known methods of organic silicon chemistry. Thus, for example, Si—O—C linkages may be converted into Si—OH and Si—O—Si bonds by hydrolysis. Further, the reaction products, if necessary with the addition of further organosiloxanes, can be equilibrated pursuant to known processes. In doing so, however, it should be considered that the ester bonds are subject to cleavage and care in this connection has to be taken. Alkalisiloxanolates may be used as equilibration catalysts in a satisfying manner.

The invention is not limited to the reaction of the carboxylic acids or their anhydrides with siloxanes of the general Formula I. Thus, according to a further aspect of the invention, additional organosilicon compounds containing $R^1$—Si≡ groups may be added to the reaction system. Such additional organosilicon compounds are, however, not organo-functional.

Thus, in accordance with this further aspect of the invention, the basic reaction between the carboxylic acid and the compound of the Formula I is performed in the presence of silanes of the general formula $$R^1_a SiR^4_{4-a}$$

wherein $R^1$ has the same meaning as above, $R^4$ is a monovalent hydrocarbon and $a$ is 1, 2, 3 or 4.

According to a still further aspect of the invention, the inventive basic reaction may be performed in the presence of polysiloxanes of the general formula

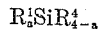

wherein $R^1$ and $R^4$ have the above given meanings, $b$ is a number between 0.1 and 3, $c$ is a number between 0 and 2.9 and $c+b=3$. These non-organofunctional Si units are incorporated into the skeleton of the organofunctional ester-modified polysiloxanes by reactions as, for example, illustrated by the Formulas (c) and (d) above. In this manner, subsequent equilibrium procedures are rendered superfluous. The following examples may be mentioned as non-organo-functional silicon compounds: tetramethoxysilane, methyltriethoxysilane, α-ω-dialkoxypolydimethylsiloxane and phenyltriethoxysilane. The reaction products contain additionally siloxane moieties of the general formula

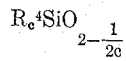

wherein $R^4$ has the above indicated meaning, i.e. is a hydrocarbon group and $c$ is a number between 0 and 2.9.

The formation of by-products of the formula $R^1H$ or $R^1COR$, respectively, cannot be prevented if the esterification reaction is performed with carboxylic acids or their anhydrides in the manner described above. The formation of such by-products, however may be disadvantageous if the carboxylic acids or their anhydrides are expensive or difficult to procure or if separation of the by-products from the reaction product proper can be effected in cumbersome and complicated manner only.

Accordingly, it is a further object of this invention to prevent the formation of such by-products by providing a suitable procedure. Pursuant to this latter aspect of the invention, the compounds of Formula I are first hydrolyzed and condensed and are thereafter reacted with compounds of Formula II or III after prior separation of the formed hydrogen halide or alcohol, respectively. Formula III referred to in more detail later on has the structure $$Y.R^3.COCl$$

wherein $R^3$ has the above defined meaning and $Y$ is hydrogen or a carboxychloride group. The hydrogen halide or alcohol, respectively, or the mixture of both which is formed during the hydrolysis, is removed from the product of hydrolysis. The removal is preferably effected by distillation, if necessary under elevated temperature conditions and reduced pressure.

The hydrolysis results in the formation of polysiloxanes corresponding to the following reaction equation:

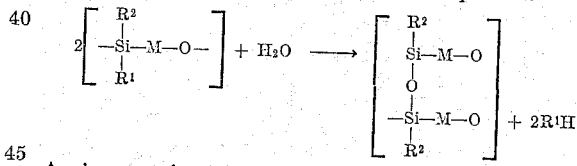

An increase in the viscosity can frequently be observed, particularly if also $R^2$ is capable of hydrolysis. In such instances, an inert solvent such as, for example, acetone, benzene, toluene, or the like may be used.

The hydrolysis is advantageously effected prior to the inventive esterification. The compound of the Formula I which contains the siloxyalkyl groups is admixed with the corresponding amount of water. As previously mentioned, the compound of the Formula I may be dissolved in an inert solvent. The hydrolysis may be effected with amounts of water which are stoichiometric with regard to $R^1$ and, in some instances, with regard to $R^2$ also. However, it is oftentimes of advantage to effect the hydrolysis with excess amounts of water. The mixture is stirred and the alcohol or hydrogen halide which is formed during the hydrolysis, is removed. If the hydrolysis is performed with an excess of water, the excess water is also removed. The removal of the alcohol or hydrogen halide and the water excess, if any, is preferably effected by distillation. If necessary, reduced pressure may be employed. However, it is also possible to expel the hydrogen halide by means of an inert gas such as nitrogen which is passed through the mixture. It should be pointed out that it is not required to remove the total amount of hydrogen halide from the reaction mixture, since the hydrogen halide is capable of catalytically influencing the subsequent esterification reaction.

According to an alternative procedure, the water which is required for the hydrolysis may be admixed to Compound I simultaneously with the carboxylic acid. As the hydrolysis speed is greater than the speed of the reaction of the starting compound with the carboxylic acids or their anhydrides, hydrolysis takes place first, followed by the subsequent esterification. Of course, it is feasible that both reactions to a certain extent overlap with regard to their time sequence.

The hydrolysis may be performed in the presence of other silicon organic non-organo-functional compounds containing $R^1$—Si≡ groups such as, for example, alkoxysilanes, chlorosilanes or siloxanes which are end-blocked by chlorine or alkoxy groups. These non-organo-functional Si units are incorporated into the skeleton of the organo-functional ester-modified polysiloxanes by the occurrence of condensation reactions so that any subsequent equilibration is rendered unnecessary. Examples of such non-organo-functional silicon compounds are tetramethoxysilane, methyltriethoxysilane, α - ω - dialkoxypolydimethylsiloxane and phenyltriethoxysilane, as previously referred to. As previously mentioned, the reaction products also comprise siloxane moieties of the general formula

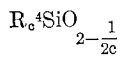

wherein $R^4$ is a hydrocarbon group and $c$ is a number between 0 and 2.9.

The amount of water for the hydrolysis referred to may be chosen so as to be insufficient, sufficient, or in excess for hydrolysing all the halogen or alkoxy groups which are bonded to the silicon atom and which are capable of hydrolysis.

The reaction of the compounds of Formula I which contain the siloxyalkyl groups with the compounds of the Formula II, X·R³·COOH or their anhydrides has ordinarily to be carried out at relatively high temperatures, for example, in the range of 150 to 180° C. This reaction yields polysiloxane in a single stage. In many instances, however, particularly if carboxylic acids of complicated structure are used, it is desirable and sometimes indispensible to perform the esterification at lower reaction temperatures. Further, it is oftentimes of advantage to subdivide the reaction, which normally directly results in the corresponding polysiloxanes, into several stages to obtain modified polysiloxanes in a simple and controllable manner.

Accordingly, a further aspect of the invention is to provide a process wherein compounds of the above Formula I are first reacted with carboxylic acid chlorides of the general formula $$Y·R^3·COCl \qquad (III)$$

wherein $R^3$ has the above defined meaning and Y is hydrogen or a carboxychloride group, and then converting the reaction product obtained into polysiloxanes by hydrolysis and condensation. The reaction referred to can also be carried out with mixtures of different compounds of the general Formula III above.

The first stage of the reaction proceeds then substantially according to the following formula:

wherein $x$ is a whole number.

If a hydrolyzed starting product is used, the reaction may be represented as follows:

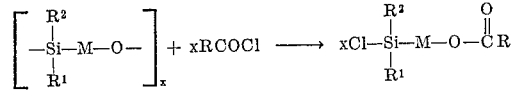

wherein $x$ is a whole number.

If $R^2$ is halogen or alkoxy, $R^2$ may be split off by subsequent hydrolysis, in which event further Si—O—Si bridges are formed. Of course, it is feasible that a number of —MOH—groups can be formed during the hydrolysis. If $R^2$ is alkoxy, it is feasible that the following side reaction takes place:

$$\equiv SiR^2 + RCOCl \rightarrow \equiv SiCl + RCOR^2$$

The esterification reaction takes place in most instances at room temperature. Only in exceptional cases is it necessary slightly to heat the reaction mixture. Due to side reactions, M—Cl groups as well as additional Si—O—Si bridges may be formed if the esterification is performed at elevated temperatures. The reaction course may also be accelerated by the addition of catalysts. This means that the reaction can be carried out at lower temperatures in the presence of catalysts. However, in most instances, the admixture of a catalyst is only required if M stands for alkylene having more than three carbon atoms. Proton donors, such as acids, including Lewis acids, may be used as catalysts.

In many instances, it is recommended to use an inert solvent for the purpose of diluting the reaction mixture or for reducing the viscosity of the reaction mixture.

Preferred carboxylic acid chlorides are those containing more than five carbon atoms in the molecule. Examples of such carboxylic acid chloride are alkylcarboxylic acid chlorides such as lauroylchloride, stearoylchloride, pimelicacid chloride, fumaric aciddichloride and the like. Further, aromatic acid chlorides result in products with valuable characteristics. Thus, phthalic acid dichloride and its isomeric derivatives may be used.

The primary reaction products which are thus obtained by the reaction with the carboxylic acid chloride can be converted into polysiloxanes according to known methods with which the silicon chemist is well conversant.

The last mentioned inventive process has the important advantage that the formation of the polysiloxanes from the primary reaction product by hydrolysis and condensation also takes place in the presence of other silicon compounds which are capable of undergoing hydrolysis and condensation. Further, equilibration may be effected prior to the hydrolysis and condensation. Thus, for example, the reaction products may be hydrolyzed with silanes of the general formula

wherein $R^1$ has the above defined meaning and thus is halogen or alkoxy and $R^4$ is a suitable hydrocarbon group, while $a$ stands for 1, 2, 3, or 4. The mixed hydrolization product is then condensed. The condensation reaction may be illustrated by the following formula:

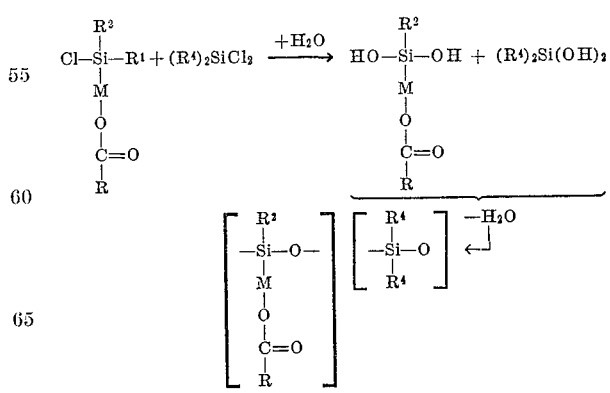

If the hydrolysis of the primarily formed reaction products is carried out under mild conditions, for example, with neutralization of the acids which are liberated during the hydrolysis, or if the substituent $R^2$ causes a steric impediment, low molecular siloxanols may be obtained in addition to the monomeric silanols. Such low molecular siloxanols are, for example, 1,3-dihydroxydisiloxanes. This may be represented by the following formula:

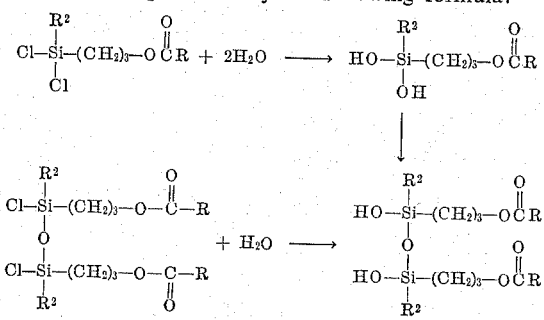

These compounds, in turn, may be condensed with silanes or siloxanes containing Si—X groups wherein X is halogen or alkoxy.

Suitable compounds for this purpose are, for example, the α-ω-dialkoxydimethylsiloxanes. In this manner, block polymers are obtained, for example, according to the following reaction:

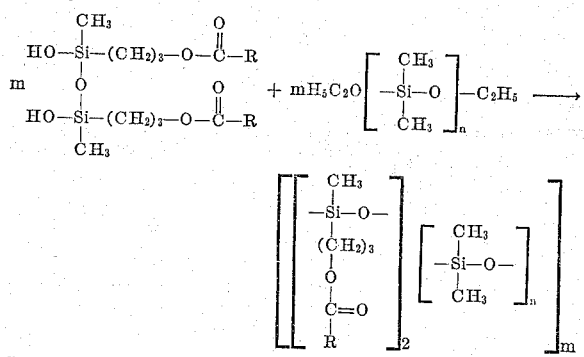

In these formulae $m$ and $n$ are whole numbers. These polymers thus contain the group OH or OR in terminal position. Of course, it is also feasible to produce the above-indicated block polymers from the mentioned reaction products between the compounds of the Formula I and the carboxylic acid chlorides of the general Formula III and siloxanols, for example, α-ω-dihydroxysiloxanes. This may be represented by the following reactions:

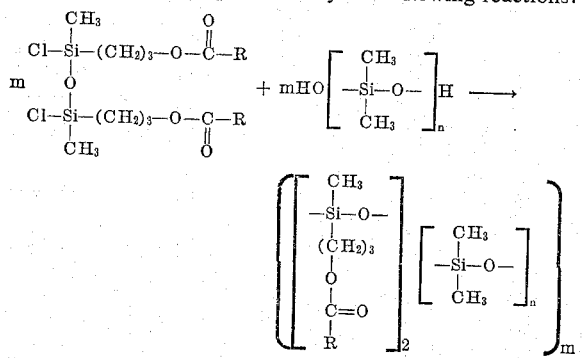

In these formulae $m$ and $n$ are whole numbers. Such compounds exhibit properties which are between those of pure organo-functional siloxanes and the known alkylsiloxanes. Thus, for example, silicon oils with predominantly

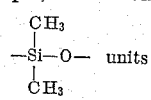

may be produced in accordance with the inventive process. These silicon oils are soluble in fatty oils.

The primarily obtained reaction products may be equilibrated with siloxanes prior to the hydrolysis. Particularly suitable for this purpose are chlorosiloxanes containing silylsulphate groups. These may be represented by the formula

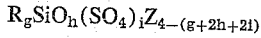

In this formula, R stands for a suitable hydrocarbon group, Z is halogen, $g$ has a value between 0.9 to 2.2, $h$ has a value of 0.75 to 1.5 and $i$ has a value of 0.001 to 0.1, while $4 > (g+2h+2i) > 2$. Due to the content of silylsulphate groups in the compounds, the addition of an equilibration catalyst is usually unnecessary.

The transformation of the primarily formed reaction products into the corresponding polysiloxanes and the modification thereof which is simultaneously accomplished, presents many possibilities to the expert for preparing compounds whose characteristics and properties are more suitably adapted to the particular field of utilization.

The inventive compounds may be used for many different purposes, the particular property of the respective products being dependent on the kind of carboxylic acid. Thus, by suitably choosing a particular carboxylic acid, a desired characteristics suitable or required for a particular purpose may be imparted to the final product. Thus, for example, the modified siloxanes are suitable as impregnating agents for textiles, leather, paper and the like materials. They can also be used as lubricants. Siloxanes which are modified with unsaturated acids also find use as molding resins; derivatives of polybasic acids may be used as resin components for polyester resins. The reaction products with perfluorinated carboxylic acids have both oil and water repelling characteristics. Long chain carboxylic acids results in siloxanes which are soluble in fatty oils and thus are suitable for cosmetic purposes. SH-containing products are also of interest to the cosmetic industry. The reaction products which are formed from 1-alkoxy-1-methyl-1,2-siloxacyclopentane or its polymers and long chain carboxylic acids with 6 to 18 carbon atoms, for example, lauric acid, palmitinic acid and stearic acid are very suitable for softening high molecular waxes which, for example, are used for textile purposes. In rendering textile materials hydrophobic, the very hydrophobic substances of this invention do not tend to foam in solvents, which is of particular advantage in the treatment of textiles and in cleaning plants operating on a chemical principle.

The invention will now be described by a number of examples, it being understood, however, that these examples are given by way of illustration and not by way of limitation and that many changes may be performed without affecting the spirit and scope of this invention as recited in the appended claims.

*Example 1*

A mixture is prepared of:
292 grams of 1-methyl - 1- ethoxy - 1,2-siloxacyclopentane in predominantly polymeric form;
600 grams of lauric acid (mole weight calculated from the acid number=200); and
3 grams of SnCl$_2$.

The mixture is heated for there hours at 160° C. while passing a weak current of N$_2$ therethrough. 68.3 grams of ethanol escaped during this period (74.3% of the theoretical amount). The residue was freed from excess lauric acid and from lauric acid ethyl ester at a pressure of 0.3 mm. Hg. A total of 51 grams of lauric acid and 180 grams of lauric acid ethyl ester were thus removed by distillation. The residue consisting of 589 grams (98% calculated on the theory) of a yellowish liquid was liberated from the catalyst by way of filtration. The residue, upon filtration and at a temperature of 90° C., has a viscosity of 144 cp. and a saponification number of 186.4. (The theoretical value for

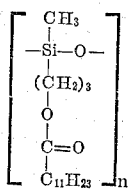

would be 187.8.) The substance was then distilled in a thin layer evaporator which was heated to about 300° C. The pressure was $5.10^{-2}$ mm. Hg. About 60% could be distilled in this manner during one passage through the evaporator. The distillate was analyzed in cryoscopic manner to yield a mole weight of 1160. (Theoretically, if $n=4$, the mole weight would be 1200.)

Elementary analysis resulted in the following values.—
Si: Actual, 9.17%; theoretical, 9.34%. C: Actual, 64.6%; theoretical, 64.0%. H: Actual, 11.0%; theoretical 10.7%.

Example II (a) 1-methyl-1-ethoxy-1,2-siloxacyclopentane was reacted with stearic acid in a manner analogous to Example I. The reaction product was a solid mass having a melting point of 44° C. The saponification number was 144.2 (theoretical value 146.1). The yield was about 96%. The reaction product was distilled under conditions for molecular distillation (300° C., $5.10^{-4}$ mm. Hg) 60% of the product could be distilled during one passage through the evaporator. The molecular weight was calculated at 1542 (theoretical value for the tetramer ($n=4$) being 1538). The Si content was 7.25% (theoretical value 7.30%).

(b) The experiment was repeated with oleic acid. The reaction product was a yellow liquid with a saponification number of 149. (The saponification number calculated from the acid number of the oleic acid employed was 148.8.) The yield was again about 96%. Distillation could be effected in the same manner as with the stearic acid product. The molecular weight was 1520 as compared to the theoretical value of 1531. The actual Si content was 7.36%, while the theoretical value was 7.34%.

Example III 48.7 grams of 1-methyl-1-ethoxy-1,2-siloxacyclopentane (0.333 mol) in predominantly polymeric form were heated with 32.7 grams of maleic acid anhydride (0.333 mol). The heating was effected for four hours at a temperature of 130° C. A weak HCl current was passed through the mixture. A viscous mass was obtained which solidified to a gel which was easily soluble in acetone. The gel is suitable for incorporation into other polyester resin systems. Analysis showed that 0.562 mol of ester groups had been formed. This means that about 0.1 mol of acid groups were available for further esterification reactions. By brief heating at lower temperatures, more mobile resins may be produced which have more reaction areas for other esterification partners.

Example IV 58.7 grams of 1,1-diethoxy-1,2-siloxacyclopentane in predominantly polymeric form were heated with 200 grams of lauric acid and 1 gram of tin octanoate. The heating was effected for five hours at 160 to 180° C. After removal of distillable components, 83 grams of a liquid remained as a residue. The liquid had a viscosity of 5710 cp. and a saponification number of 182 (theory 191.5). The ester content of the product could be still further increased by a subsequent after treatment with lauric acid in the presence of a fresh amount of catalyst and toluene as diluent.

Example V 48.7 grams of 1-methyl-1-ethoxy-1,2-siloxacyclopentane in predominantly polymeric form, 26.7 grams of phenyltriethoxysilane and 173.3 grams of lauric acid were heated to a temperature of 160 to 180° C. After separation of the volatile components, 115 grams of an oil having a viscosity of 340 cp. were obtained. The oil had a saponification number of 155. In infrared spectrum, the oil exhibited characteristics indicating the presence of Si-phenyl groupings.

Example VI

Example I was repeated, but the lauric acid used therein was replaced by perfluoroctanoic acid. An oily product was obtained which, together with zirconium acetate, is capable of imparting hydrophobic and oleophobic properties of textiles.

Example VII

Example I was repeated, but the lauric acid used therein was replaced in one instance by caprylic acid and in another instance by caproic acid. The compound of the general Formula I used in the example was 1-methyl-1-methoxy-1,2-siloxacyclopentane in predominantly polymeric form. Siloxanes, soluble in fatty oils, were obtained.

The cyclic modified siloxanes could be separated from the reaction product by molecular distillation. In the instance of the caproic acid reaction product, about 60% of the reaction product distilled at 220° and $5.10^{-4}$ mm. Hg. The molecular weight was determined in cryoscopic manner and amounted to 940 (theoretical value for the tetramer is 865). The saponification number was 257 (theoretical value 259). The Si content was 12.90% (theoretical 12.96%).

With regard to the caprylic acid reaction product, again about 60% of the product could be distilled under the conditions set forth above. The mean molecular weight was 1060 (theoretical for the tetramer 978), the saponification number was 227 (theoretical 229.5), while the Si content was 11.6% (theoretical 11.5%).

Example VIII 34.1 grams of 1-chloro-1-methyl-1,2-siloxacyclopentane in predominantly polymeric form, 75 grams of lauric acid and 0.5 gram of $SnCl_2$ were heated to 150° C. Volatile products were separated. The residue consisted of 70.5 grams (94%) of a dark colored oil having a saponification number of 180. The oil could be decolorized by means of active carbon in an ethanol solution.

Example IX 146 grams of 1-ethoxy-1-methyl-1,2-siloxacyclopentane (1 mol) in partly polymeric form were mixed with 260 grams of lauric acid (1.3 mol) and 18 grams of water (1 mol). 1.5 grams of tin 2-chloride were added and the mixture thus obtained was gradually heated to 160° C. In doing so, 45.8 grams of an ethanol-water mixture distilled off. This amounts to about 83% of the theoretical amount. The residue was freed from volatile components by vacuum distillation in a thin layer evaporator. 62.9 grams of lauri acid (0.31 mol) and 19.9 grams of lauric acid ethylester (0.09 mol) were thus removed by distillation. 283 grams (94.5% of the theoretical amount) remained as residue. This residue was a slightly yellowish oil having a viscosity of 183 cp. at 20° C. According to its saponification number, 95% of the oil consisted of the compound

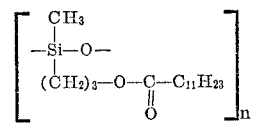

Example X

Analogous to Example IX, 160 grams (1 mol) of 1-ethoxy-1,4-dimethyl-1,2-siloxacyclopentane in partially polymeric form were reacted with 260 grams of lauric acid (1.3 mol). 294 grams (93.5% of the theoretical amount) remained as residue. The residue was a slightly yellowish oil having a viscosity of 192 cp. According to its saponification number of 171.2 (theoretical 178.4), it consisted of 96% of the compound

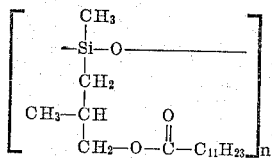

Example XI

A mixture was prepared consisting of 48.7 grams of 1-ethoxy-1-methyl-1,2 - siloxacyclopentane (⅓ mol) in partly polymeric form, 167.2 grams (0.5 mol) of behenic acid and 0.5 gram of SnCl₂. The mixture was heated for three hours to a temperature of 160° while passing a weak nitrogen current therethrough. Thereafter, the mixture was heated for a further two hours to 200° C. The product was subjected to vacuum distillation with ever increasing vacuum. The final vacuum value was 0.1 mm. Hg. 140 grams (96.7% of the theoretical amount) of a darkly colored residue were obtained. The residue, after having determined the saponification number of 126 (theoretical 127.2) consisted of 99% of the compound

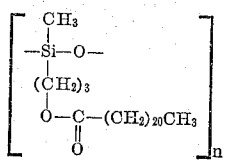

The solidification point of the residue was 55.5% C.

Example XII 48.7 grams (⅓ mol) of 1-ethoxy-1-methyl-1,2-siloxacyclopentane in partially polymeric form, 29.9 grams (0.18 mol) of terephthalic acid, 18 grams (1 mol) of water, 1.5 grams of SnCl₂ and 100 cc. of dekalin were reacted in a manner analogous to the procedure described in connection with Example IX. After processing the reaction product in the manner described in Example IX, a residue weighing 57 grams was obtained (93.4% of the theoretical amount). The residue was a dark colored resin having a saponification number of 320 (theoretical 306). The resin was dissolved in benzene and a smooth metal surface was sprayed therewith. After evaporation of the benzene, a smooth resin film adhered to the metal surface.

Example XIII

The lauric acid of Example IX was replaced by 362 grams (1.3 mol) of linoleic acid. The reaction was moreover carried out in a pure nitrogen atmosphere. 358 grams (94.5% of the theoretical value) of a yellow-brown viscous oil was obtained. The oil had a saponification number of 145.2 (theoretical 147.8). A sample of this oil was admixed with a cobalt salt and was painted onto a smooth metal surface. The oil hardened to a transparent resin film.

Example XIV 146 grams (1 mol) of 1-ethoxy-1-methyl-1,2-siloxacyclopentane in partially polymeric form were admixed with 130 grams (0.65 mol) of lauric acid, 174.2 grams (0.65 mol) of stearic acid, 18 grams (1 mol) of water and 1.5 grams of SnCl₂. The mixture was heated for two hours to a temperature of 120° C. and was then further heated for an additional four hours to 165° C. Substances subject to distillation were removed from the reaction product in a thin layer evaporator which was heated to 220° C. The distillation was effected at a pressure of 20 mm. Hg. A residue of 305 grams (91.3% of the theoretical amount) was obtained. The residue was slightly yellowish, had a melting point of 19 to 23° C. and a viscosity of 202.8 cp. measured at 25° C. A saponification number of 168 was calculated for a product containing 50% of lauric acid ester groups and 50% of stearic acid ester groups. The actual saponification number of the product was 166.2.

Example XV 29.2 grams of 1-methyl-1-ethoxy-1,2-siloxacyclopentane in predominantly polymeric form, 160.1 grams of α-ω-diethoxypolydimethylsiloxane of the average chain length of 12.1, 60 grams of lauric acid, 9.5 grams of water and 1 gram of SnCl₂ were heated to a temperature of 120° C. for one hour. The heating was performed under stirring. Toluene was constantly dropped into the mixture for the purpose of azeotropically removing the water. The toluene was constantly distilled off. The reaction product was washed several times with methanol in order to remove excess lauric acid and small amounts of lauric acid ethyl ester. 185 grams of an oil remained as residue. The oil had a viscosity of 600 cp. at a temperature of 20° C. The oil dissolved easily upon heating in cotton-wool seedling oil. The oil contained 0.195 mol (theoretical amount 0.2 mol) of esterified lauric acid. The presence of

groups was demonstrated in infrared spectroscopic manner. OH and OC₂H₅ are probably present in terminal positions.

Example XVI 48.75 grams of 1-methyl-1-ethoxy-1,2-siloxacyclopentane in predominantly polymeric form, 15.76 grams of trimethylethoxysilane, 4.28 grams of water and 39.9 grams of freshly distilled thioglycolic acid were gradually heated to 160° C. under stirring. During the heating, 21 grams of a mixture consisting of ethanol, water and hexamethyldisiloxane evaporated. Thioglycolic acid was removed from the residue by distillation at 0.1 mm. Hg. A highly viscous oil containing 14.1% of sulphur and 0.675% of active hydrogen was obtained. The oil weighed 62.5 grams. The presence of end-blocking (CH₃)₃SiO groups was established in infrared spectroscopic manner.

Example XVII 160 grams of 1-methyl-1-ethoxy-1,2-siloxacyclohexane were reacted with 230 grams of lauric acid and 9 grams of water in the presence of 0.5 gram of SnCl₂. The reaction was performed at a temperature of 120 to 180° C. For the purpose of more efficiently separating water and ethanol from the reaction mixture at the end of the reaction, toluene was slowly added in drop-wise manner and constantly removed by distillation. After separation of volatile components, 317 grams of a viscous oil having a saponification number of 176 were obtained. The theoretical saponification number is 178.

Example XVIII 73 grams of 1-methyl-1-ethoxy-1,2-siloxacyclopentane in predominantly polymeric form, 29.5 grams of trimethylethoxysilane, 6.75 grams of water and 69 grams of salicyclic acid were gradually heated to 190° C. in the presence of 1 gram of SnCl₂. In doing so, 50 grams of the volatile mixture distilled off. The esterification was then completed by the addition of toluene for the purpose of azeotropic water removal. 125 grams of a highly polymeric oil were obtained as residue. The oil exhibited pronounced ultraviolet absorption at 280 to 300 mμ. The oil was suitable as addition to suntan lotions.

Example XIX 146 grams of 1-methyl-1-ethoxy-1,2 - siloxacyclopentane in predominantly polymeric form were admixed with 4.9 grams of water and 5 grams of aqueous HCl (n/10). A homogeneous solution was obtained from which gel-like products separated in rapid manner. Upon heating to 150° C., 46.2 grams of an ethanol-water mixture were removed by distillation. 109 grams (100% of the theory) remained. The remainder was a hard and brittle substance. This substance was admixed with 218.5 grams of lauroylchloride. After standing for eight hours, the major portion of the solid residue had dissolved. A homogeneous reaction mixture was obtained by brief heating to 100° C. The yield was 324 grams (99%). The liquid was analyzed and contained 0.93 gram atom of chlorine (theory 1.0), 0.94 val. of acid (theory 1.0) and 1.0) mol of ester (theory 1.0). The cryoscopic molecular weight determination resulted in the value 620 while the molecular weight of the compound

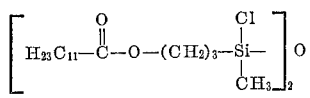

amounts to 655.

50 grams of this liquid were hydrolyzed by adding it in drop-wise manner into 250 ml. of saturated $NaHCO_3$ solution. After repeated washing and subsequent drying, 46 grams of an oily liquid was isolated. This oily liquid had a density of about 0.97 and a viscosity of 200 cp. at 20° C. The cryoscopically determined molecular weight (930) and the determination of the OH groups by means of reaction with isocyanate (3.51% OH) indicate that the oil has an average composition corresponding to the formula

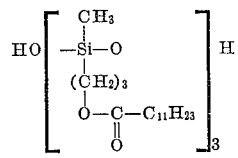

(molecular weight 918, OH=3.7%). Hydrolysis under mild conditions (for example, use of an inert solvent) results in formation of the corresponding disiloxanol.

This oil, at an acid pH, can be condensed to a siloxane which is substantially free from hydroxyl groups. Siloxanol and siloxane are both suitable for imparting hydrophobic properties to textile fabrics. If the textile is impregnated with a solution of the compound in a suitable solvent as, for example, trichloroethylene, the additional advantage is obtained that the solutions do not foam. As is well known, the prior art silicon oil solutions tend to foam. Hardeners may be added and in this connection, for example, zirconium alkoxides, zirconium acetate and tin compounds may be mentioned.

*Example XX*

The procedure of Example XIX was repeated, but the lauroylchloride was replaced by 101.5 grams (0.5 mol) of phthalic acid dichloride. 205 grams (93.9% of the theory) of a viscous liquid was obtained which, calculated on the formula

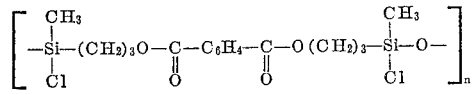

contained 0.97 gram atom of chlorine.

While specific embodiments of the invention have been shown and described to illustrate the application of the inventive principles, it will be understood that the invention may be embodied otherwise without departing from such principles.

What is claimed is:

1. A process of preparing acyloxyalkyl group containing polysiloxanes which comprises reacting compounds of the unit formula

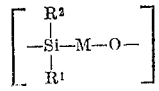

(I)

wherein $R^1$ is selected from the group consisting of hydrolyzable halogen and alkoxy, $R^2$ is selected from the group consisting of hydrolyzable halogen, alkoxy and monovalent hydrocarbon, and M stands for alkylene of 3–4 carbon atoms which bridges the Si in the formula with the oxygen atom through at least three carbon atoms, with a member selected from the group consisting of (a) carboxylic acids of the general formula $X \cdot R^3 \cdot COOH$, wherein $R^3$ is selected from the group consisting of unsaturated and saturated divalent hydrocarbon, X is selected from the group consisting of hydrogen and carboxyl,
(b) the anhydrides of (a),
(c) mixtures of (a) and (b),
(d) carboxylic acid chlorides of the general formula $Y \cdot R^3 \cdot COCl$, wherein $R^3$ has the above meaning and Y is selected from the group consisting of hydrogen and carboxychloride, and, when said member is (d), subjecting the reaction product to hydrolysis and condensation, said reaction resulting in a rearrangement which, when said member is represented by $XR^3COOH$, proceeds according to the equation

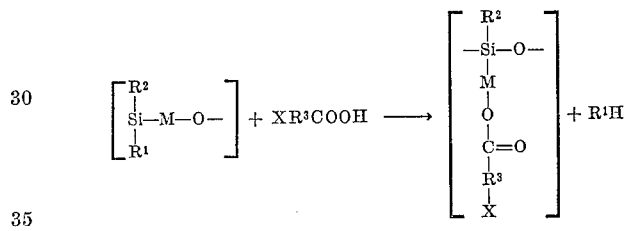

2. A process as claimed in claim 1, wherein M is selected from the group consisting of propylene and butylene.
3. A process as claimed in claim 1, wherein $R^1$ stands for alkoxy having 1 to 4 carbon atoms.
4. A process as claimed in claim 1, wherein $R^2$ is equal to $R^1$.
5. A process as claimed in claim 1, wherein $R^2$ is methyl.
6. A process as claimed in claim 1, wherein $R^2$ is ethyl.
7. A process as claimed in claim 1, wherein $R^2$ is phenyl.
8. A process as claimed in claim 1, wherein the compound of Formula I essentially consists of units of the formula

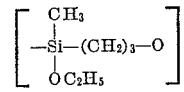

9. A process as claimed in claim 1, wherein said member is an alkyl carboxylic acid having from 5 to 21 carbon atoms.
10. A process as claimed in claim 9, wherein the hydrogen radicals in said alkyl carboxylic acid are at least partially replaced by fluorine.
11. A process as claimed in claim 1, wherein said member is phthalic acid.
12. A process as claimed in claim 1, wherein said member is thioglycolic acid.
13. A process as claimed in claim 1, wherein said member is an alkyl carboxylic acid chloride with from 5 to 21 carbon atoms.
14. A process as claimed in claim 1, wherein said reaction is carried out at a temperature of between 110 and 250° C.

15. A process as claimed in claim 1, wherein the reaction is performed in the presence of silanes of the general formula $$R^1_a SiR^4_{4-a}$$

wherein $R^1$ has the above-indicated meaning, $R^4$ is a monovalent hydrocarbon and $a$ is one of the numbers 1, 2, 3 and 4.

16. A process as claimed in claim 1, wherein the reaction is carried out in the presence of polysiloxanes of the general average formula $$R^1_b R^4_c SiO_{2-\frac{1}{2(b+c)}}$$

wherein $R^4$ is a monovalent hydrocarbon, $b$ is a number between 0.1 and 3, $c$ is a number between 0 and 2.9 and $c+b \leq 3$.

17. A process of preparing acyloxyalkyl group containing polysiloxanes which comprises hydrolyzing a system essentially consisting of compounds of the unit formula

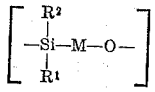

wherein $R^1$ is selected from the group consisting of hydrolyzable halogen and alkoxy, $R^2$ is selected from the group consisting of hydrolyzable halogen, alkoxy and monovalent hydrocarbon, and M stands for alkylene of 3–4 carbon atoms which bridges the Si in the formula with the oxygen atom through at least three carbon atoms, condensing the hydrolyzate, whereby $R^1H$ groups are formed, separating the $R^1H$ groups and thereafter reacting the residue with a member selected from the group consisting of (a) carboxylic acids of the general formula $X \cdot R^3 \cdot COOH$, wherein $R^3$ is selected from the group consisting of unsaturated and saturated divalent hydrocarbon, X is selected from the group consisting of hydrogen and carboxyl,
(b) the anhydrides of (a),
(c) mixtures of (a) and (b),
(d) carboxylic acid chlorides of the general formula $Y \cdot R^3 \cdot COCl$, wherein $R^3$ has the above meaning and Y is selected from the group consisting of hydrogen and carboxychloride, said reaction resulting in a rearrangement which, when said member is represented by $XR^3COOH$, proceeds according to the equation

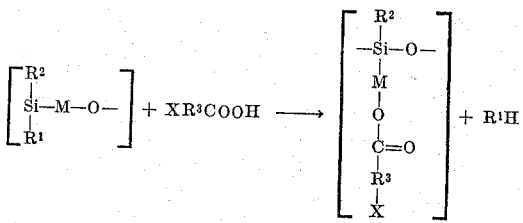

18. A process as claimed in claim 17, wherein the reaction is performed in the presence of silanes of the general formula $$R^1_a SiR^4_{4-a}$$

wherein $R^1$ has the above-indicated meaning, $R^4$ is a monovalent hydrocarbon and $a$ is one of the numbers 1, 2, 3 and 4.

19. A process as claimed in claim 17, wherein the reaction is carried out in the presence of polysiloxanes of the general average mean formula $$R^1_b R^4_c SiO_{2-\frac{1}{2(b+c)}}$$

wherein $R^4$ is a monovalent hydrocarbon, $b$ is a number between 0.1 and 3, $c$ is a number between 0 and 2.9 and $c+b \leq 3$.

20. A cyclic siloxane of the general formula

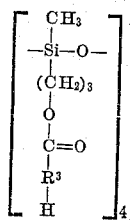

wherein $R^3$ is a divalent hydrocarbon with 5 to 21 carbon atoms.

References Cited

UNITED STATES PATENTS

| | | | |
|---|---|---|---|
| 2,898,361 | 8/1959 | Barnes | 260—448.2 |
| 2,906,735 | 9/1959 | Speier | 260—448.2 |
| 2,922,806 | 1/1960 | Merker | 260—448.2 |
| 2,924,588 | 2/1960 | Speier | 260—448.2 |
| 3,249,464 | 5/1966 | Nelson et al. | 260—448.2 X |

TOBIAS E. LEVOW, *Primary Examiner.*

HELEN McCARTHY, *Examiner.*

P. F. SHAVER, *Assistant Examiner.*